United States Patent

[11] 3,620,625

| [72] | Inventor | Ruben Valdemar Tegholm<br>Johanneshov, Sweden |
|------|----------|-----------------------------------------------|
| [21] | Appl. No. | 773,242 |
| [22] | Filed | Nov. 4, 1968 |
| [45] | Patented | Nov. 16, 1971 |
| [73] | Assignee | Atlas Copco AB<br>Nacka, Sweden |
| [32] | Priority | Nov. 3, 1967 |
| [33] | | Sweden |
| [31] | | 15105/67 |

[54] DEVICE FOR MEASURING A TUNNEL SECTION
8 Claims, 4 Drawing Figs.

[52] U.S. Cl. .................................. 356/1,
340/18 R, 343/15, 356/4
[51] Int. Cl. ........................................ G01c 3/00
[50] Field of Search ........................... 356/1, 4, 5;
340/18 BI; 343/112.3, 12, 15, 17

[56] References Cited
UNITED STATES PATENTS

| 2,216,716 | 10/1940 | Withem ...................... | 343/15 X |
| 2,506,946 | 5/1950 | Walker ....................... | 343/15 X |
| 3,435,744 | 4/1969 | Stimson ..................... | 356/4 UX |
| 3,436,720 | 4/1969 | Patterson ................... | 340/18 X |

*Primary Examiner*—Rodney D. Bennett, Jr.
*Assistant Examiner*—Joseph G. Baxter
*Attorney*—Waters, Roditi, Schwartz and Nissen ABSTRACT: A device is disclosed for measuring a tunnel section and, in particular, to obtain a graphical representation of the section. The device comprises a distance-measuring apparatus of the kind comprising a transmitter of directed radiation and a direction-sensitive receiver of the radiation, the transmitter and the receiver being arranged at a predetermined spacing from each other to define a measuring base. The transmitter and the receiver are arranged on a common support which is rotatable about an axis, the transmitter and the receiver being located substantially in a common plane which extends at right angles to the axis. The device further comprises drive means for varying in this plane the angular position of a radiation axis of at least one of either the transmitter or the receiver, control means for controlling the drive means and dependent upon the direction of radiation arriving to the receiver from the transmitter after having been reflected by a surrounding medium, and indication means for representing a magnitude as dependent upon an angle between the radiation axes of the transmitter and the receiver and of the measuring base. This magnitude is representative of the distance between the rotational axes of the support and a surface reflecting the radiation beam transmitted by the transmitter to the receiver.

DEVICE FOR MEASURING A TUNNEL SECTION

BACKGROUND OF THE INVENTION

The invention relates to a device for measuring and plotting the contour of a tunnel cross section.

Measuring and plotting the shape of a cross section of a tunnel having a contour varying along the length of the tunnel, such as sections of galleries blasted into rock, is a necessary measure for planning the work usually required for the completion of the tunnel. To this end the tunnel outlines have to be measured at comparatively close intervals to establish the tunnel profile along the length of the tunnel, the work associated with such measurement being considerable.

Present invention relates to a device by means of which a measuring or plotting at a reduced scale of contours can be made promptly and, as the case may be, automatically. A device according to the invention comprises a distance-measuring apparatus which, as well known per se in telemetry, comprises a transmitter of directional radiation and a direction-sensitive receiver of radiation of the kind transmitted by the transmitter, located at a predetermined distance from the transmitter and defining a measuring base.

SUMMARY OF THE INVENTION

According to the invention the transmitter and the receiver of such a distance-measuring apparatus are mounted on a rotatable support member at a distance from each other and located substantially in a common plane extending perpendicularly to the rotational axis of the support member, the device further comprising drive means for varying the angular position in said plane of a radiation axis of at least either one of the transmitter and receiver, control means for controlling said drive means and dependent upon the direction of radiation originating from the transmitter and after reflection arriving at the receiver, and, indicating means to indicate a quantity, the magnitude of which depends upon the magnitude of the angle between the radiation beam axes of the transmitter and the receiver, and the length of the measuring base, said quantity being representative of the distance between the axis of rotation of the support member and a surface reflecting a beam of radiation from the transmitter to the receiver.

Primarily, light radiation is employed as directional radiation in the device according to the invention, although sound of high frequency, such as ultrasonic frequencies may be used.

Most conveniently and as well known in the art, the receiver comprises two radiation-sensing means arranged adjacent the radiation axis of the receiver on either side thereof, said two radiation-sensing means constituting part of the control means mentioned above, and which, to make possible an automatic setting of either or both of the radiation axes of the receiver and the transmitter relative to the rotational support means, are connected in a balancing circuit to the drive means for varying the angular position of either transmitter or receiver or both in a direction determined by the direction of a lack of balance between said radiation-sensing means, as the case may be via amplifiers.

When using a device according to the invention, the situation may arise that a beam transmitted by the transmitter gives rise to reflected radiation which is not returned to the receiver or returned thereto in a direction substantially deviating from the radiation so far received, a situation which may, for instance, originate from a discontinuity in the outline of the section to be measured, leading to a disturbance in or even disappearance of the control required for the distance measurement. Therefore, a device according to the invention comprises, in a preferred embodiment, means to decrease the rotational speed of the support member to a low value relative to the rotational speed for a normal scanning motion of the device or to stop the support member, when the intensity of the received radiation falls below a predetermined threshold value, or when an unbalance between the output signals of the radiation-sensing means supersedes a predetermined value. The device further comprises means to maintain such low-rotational speed or, as the case may be, stoppage of the support member until the required balance of the control means under influence of a radiation received by the receiver has been reestablished by a search movement of the drive means which is activated by influence of the disturbance and in which the angle between the radiation axes of the transmitter and the receiver are varied until the restoration of a balance within the control range of the control means as dependent radiation arriving to the receiver.

BRIEF DESCRIPTION OF THE DRAWING

The invention will be explained in greater detail with reference to the accompanying drawing illustrating a preferred embodiment of a device according to the invention and comprising a light transmitter and a photocell receiver. In the drawing.

DESCRIPTION OF THE PREFERRED EMBODIMENT

Figure 1:
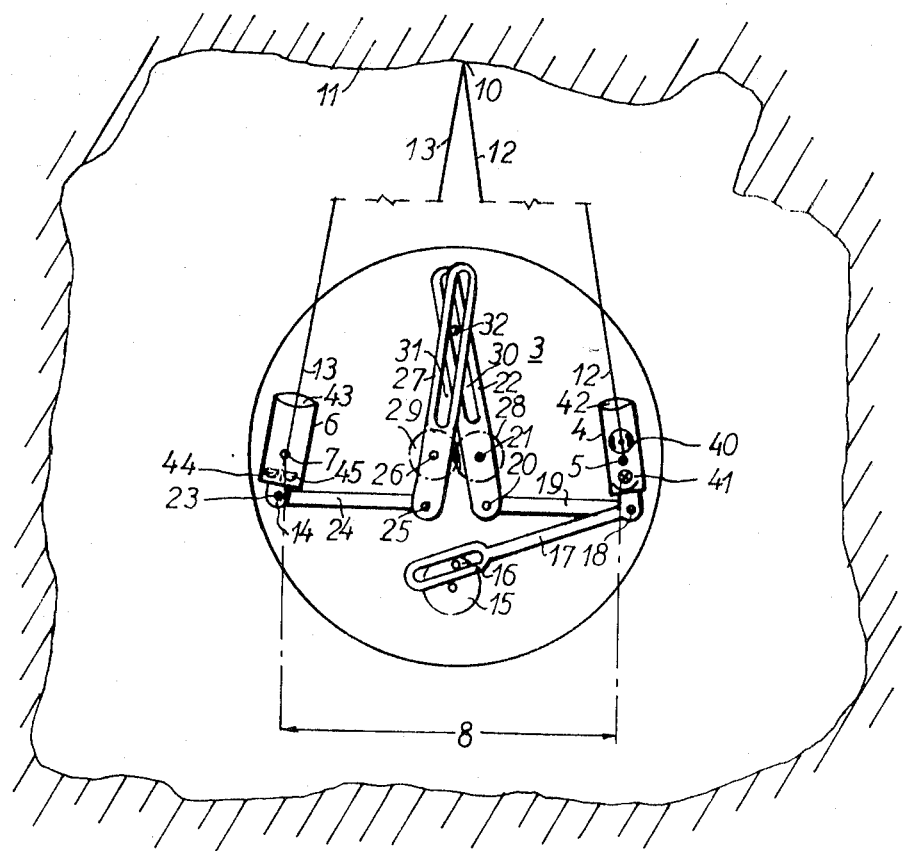
FIG. 1 diagrammatically illustrates an arrangement of a transmitter and receiver with associated means on enlarged scale for indicating a distance to a radiation-reflecting wall, the length of which corresponds to the angle between the radiation axes of the transmitter and the receiver, and the distance between the axes of rotation of the transmitter and the receiver on a rotatable support member.
Figure 2:
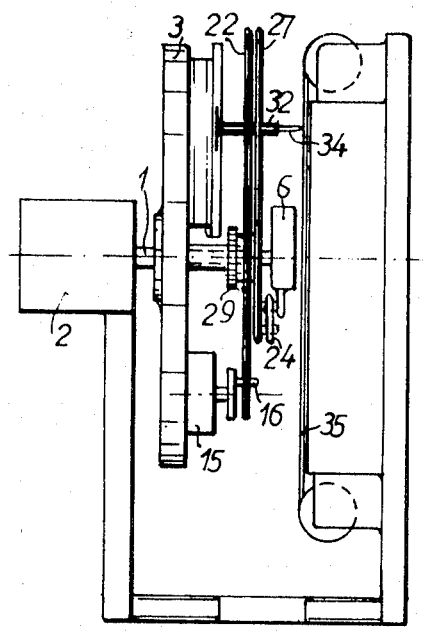
FIG. 2 is a side view of the device.

In FIGS. 1 and 2 the device according to the invention is illustrated as comprising a table 3 which is rotatable about a rotational shaft 1 by means of a drive motor 2, the table 3 constituting a support member for the distance-measuring means and distance-indicating means of the device. The measuring means comprise a light transmitter 4 which is rotatable about a pivot 5, and is parallel to and located at a distance from the shaft 1. Similarly, the light receiver 6 of the device is pivotal about a pivot 7 which is parallel to the shaft 1 and located on the table 3 remote from the pivot 5 of the transmitter. In this embodiment, the transmitter 4 as well as the receiver 6 are pivotal on the rotatable support member, although obviously, either one of the two may be fixedly attached to the member, the other one being pivotal. The transmitter 4 and the receiver 6 are, of course, so arranged that the optical axes each constitutes an angle with the measuring base 8 of the measuring device, defined by the mutual distance between the centers of rotation of the optical axes as viewed in a plane perpendicular to the rotational axis of the support member, which is as near to 90° as possible with due attention paid to the angle between the direction of the light beam transmitted by the transmitter and received by the receiver after having been reflected by a wall.

A diagram plotting the distance between the axis 1 of the support member and varying points of reflection 10 at the wall 11 for radiation transmitted by the transmitter 4 may, obviously, be produced by various means known in the art, electronic means for instance, which automatically effect a calculation of the distance in correspondence to signals, which are, in their turn, generated as representations of the angles between the optical axes 12 and 13 of the transmitter and the receiver, respectively, and the measuring base between points 5 and 7 of the device. Such computing means are as such well known and need no further description here.

In the following, the invention is described as comprising a mechanical plotting device which is rotatable together with the rotatable table 3, said plotting device plotting a diagram corresponding to a measured contour of a section on a stationary carrier, said diagram thus without further measure obtaining the same orientation relative to the rotational axis of the support member as has the measured contour.

As mentioned above, the transmitter 4 as well as the receiver 6 is, in the embodiment as illustrated, each arranged pivotally on the rotatable support member. The transmitter and receiver are connected together by means of levers and links which are subjected to simultaneous articulating movement in mutually opposite directions by means of an electric-driven servomotor 15, the shaft of which carries an eccentric crank 16, by means of which the transmitter 4 and the receiver 6 via a lever 17, as illustrated connected with the transmitter 4, are subjected to articulating movement by the servomotor. The lever 17 is connected by a pivot 18 to a link 19 in turn connected by a pivot 20 to a bar 22 which is rotatable about a pivot 21, while the receiver 6 is connected by means of a lever 14 and a pivot 23 to a link 24, the other end of which is connected to a bar 27 by a pivot 25, the bar 27 being rotatable about a pivot 26. Bars 22 and 27 are attached to gear wheels 28 and 29, respectively, which are in mesh with each other, the bars each further having a slot 30 and 31, respectively. The bars are arranged relative to each other and are so dimensioned, that a point of intersection of the bars moves a distance suitable for plotting a diagram corresponding to a change of mutual angular position between transmitter and receiver corresponding to a desired maximal measuring range of the device. Engaged at the points of intersection between the slots 30 and 31 is a central pin 32 which is connected to a plotting needle 34 and is movable in a guide extending in a direction perpendicular to the connection line between the axes of the wheels 28 and 29. Said plotting needle is arranged so as to move across a stationary carrier 35 for producing a diagram 36 (FIG. 4) plotted by the plotting needle 24 during a measurement, said diagram corresponding to the measured section in a selected scale.

The device and the function thereof is described in connection with a simplified circuit diagram for controlling the servomotor 15 as dependent upon signals received from the receiver 6 and originating from light transmitted by the transmitter 7. Control means of this kind are as such well known, and therefore they are not described in detail.

The transmitter 4 is in a manner and to an effect well known per se arranged to transmit modulated light radiation, for instance by means of a rotating light chopper arranged in the path of a beam along the optical axis 12 of the transmitter and generated by a lamp 41 and an optical system 42. The receiver has an optical system 43 and two photocells 44 and 45, arranged on either side of the optical axis 13 of the receiver in a plane perpendicular to the axis 1, each one of said photocells generating a signal as dependent upon light received thereby, said signal being applied to an amplifier 46 feeding the servomotor 15 and in a manner well known per se so arranged as to feed the servomotor 15 with a current to drive it in a direction determined by the sign of the difference between the signals from the photocells 44 and 45, the direction of rotation of course as usual being such that a decrease of the unbalance is obtained.

Figure 3:
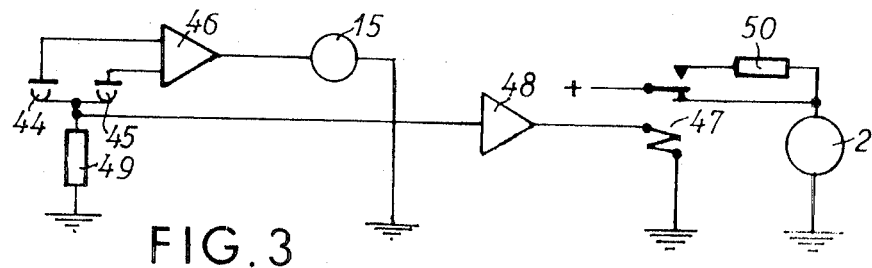
FIG. 3 is a simplified circuit of electric control and drive means of the device, comprising a servomotor for varying the angle between the optical axes of the transmitter and the receiver in a plane perpendicular to the rotational axis of the support, and means for controlling the speed of a motor to rotate the support member, and, FIG. 4 is an example of a diagram plotted with a device according to the invention.
Figure 4:
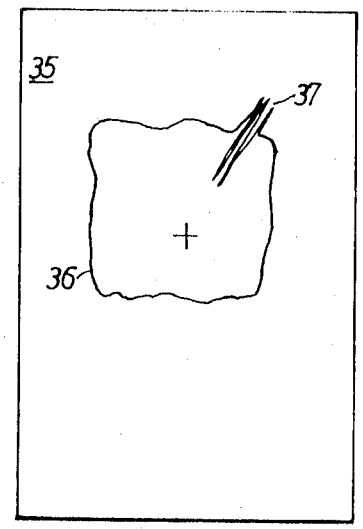

The device further comprises means which, when and if the signal from the photocells 44 and 45 fall below a predetermined value, a situation which may for instance arise for a sudden change of distance between the measuring device and a point of reflection at the wall during the rotation of the table 3, stop the drive motor 2 or cause it to move slower, the servomotor 15 at the same time and dependent upon the amplifier 46, controlled by the photocells 44 and 45, applying to the optical means on the table a comparatively rapid scanning motion. Such sequence of events is illustrated in FIG. 4 at 37. The means for switching over the drive motor 2 to lower speed or stop comprises, in the circuits illustrated in FIG. 3, a relay 47, which is fed from an amplifier 48, 48 being controlled by voltage obtained from a resistance 49 in series with the photocells 44 and 45. For a signal from the resistance 49 superceding a predetermined value, the drive motor 2 receives currents via relay 47 to drive the table 3 with a speed selected for a normal measurement, while, when the signal from the resistance 49 is below this predetermined value, the drive motor by means of the relay is set to a selected lower speed, this effect in FIG. 3 being illustrated by an impedance 50 then connected in series with motor 2.

Obviously, the embodiment described with reference to the drawing and the mechanical components thereof is only selected for illustrative purposes. So for instance, the control pin 32 can be arranged displaceable in a guide extending perpendicularly to the measuring base between points 5 and 7 said guide fulfilling the same function as the gears 28 and 29. In this way, the control pin will move back and forth in this guide when the servomotor 15 rotates. Further, the optical means of the device can be exposed to their articulating motion by the servomotor actuating a lever corresponding to lever 17 connected to a crank on the motor shaft and to the control pin 32, the control pin thus being subjected to a reciprocating movement in the guide by the servomotor, thus applying to the bars 22 and 27, and the transmitter 4 and the receiver 6 therewith, the desired articulating movement.

In the embodiment illustrated in FIG. 1 the measuring and plotting device, is, for illustrative purposes shown in an enlarged scale as compared to the surrounding tunnel profile.

While the invention has been described in detail with respect to a preferred embodiment of the invention, it will be understood by those skilled in the art, that various changes and modifications may be made without departing from the scope of the invention, and it is intended, therefore, to cover all such changes and modifications in the appended claims.

What is claimed is:

1. A device for measuring a tunnel section comprising a distance-measuring apparatus including a transmitter for directing radiation and a direction-sensitive receiver of said radiation, the transmitter and the receiver being spaced at a distance from each other, said distance defining a measuring base of said distance-measuring apparatus, the transmitter and the receiver of the distance measuring apparatus being arranged in a common plane on a common support, said support being rotatable about an axis extending substantially at right angles to said plane, said transmitter and receiver having radiation transmission and reception axes respectively, means for rotating said support about the axis thereof, drive means for varying the angular relation in said plane between the radiation transmission and reception axes of the transmitter and the receiver respectively, control means for controlling said drive means and dependent upon the direction of radiation arriving at the receiver from the transmitter after having been reflected by a surrounding medium, and indication means for representing a magnitude as dependent upon an angle between the radiation transmission and reception axes of the transmitter and the receiver respectively each relative to the measuring base.

2. A device according to claim 1 said device further comprising means for decreasing the rotational speed of said rotatable support to a lesser speed, relative to the rotational speed during measurement when the intensity of the received radiation falls below a predetermined threshold value.

3. A device according to claim 2, in which said control means comprising two radiation-sensing means arranged on either side of the radiation reception axis of the receiver to create signals, the values of which signals correspond to coincidence and a noncoincidence, respectively, between the direction of the radiation reception axis of the receiver and direction of light received thereby, and means for decreasing the rotational speed of said support to a lesser speed, relative to the rotational speed during measurement, upon a difference between said two radiation-sensing means superceding a predetermined value.

4. A device according to claim 1, comprising means for providing a continuous scanning movement of said drive means by varying the angle between the radiation transmission and reception axes of the transmitter and the receiver respectively within a range between a largest and a lowest predetermined value, and means to start such scanning movement upon a decrease in intensity below a predetermined threshold value of the radiation received by the receiver and to interrupt scanning movement upon an increase in intensity above the predetermined threshold value of radiation received by the receiver.

5. A device according to claim 3, comprising means for providing a continuous scanning movement of said drive means by varying the angle between the transmission and reception axes of the transmitter and receiver respectively within a range between a largest and a lowest predetermined value, and means to start and stop said scanning as a function of the signal difference between the two radiation-sensing means below or above respectively a predetermined threshold value.

6. A device according to claim 1 wherein said transmitter and receiver are each pivotally displaceable about axes in spaced relation, said drive means including an eccentric crank and a lever having opposite ends, one end of said lever being pivotally connected to said transmitter remote from the pivotal axis of the latter, the other end of said lever including guide means operatively associated with said eccentric crank.

7. A device as claimed in claim 6 wherein said guide means is a slot provided in said other end of the lever and in which said eccentric crank is shiftably seated.

8. A device as claimed in claim 7 comprising two bars each including respectively an elongate slotted end portion, a pair of meshed gears pivotally supported on said support and fixed to said bars respectively, a pair of links pivotally interconnecting said bars at a point remote from the slotted portions of the latter to said transmitter and receiver respectively, said slotted end portions of said bars overlying one another, and a control pin shiftably seated in each of said slotted end portions of said bars for plotting a diagram corresponding to a change of the angular relation between the transmitter and receiver.

* * * * *